(12) United States Patent
Huang

(10) Patent No.: US 9,912,567 B2
(45) Date of Patent: Mar. 6, 2018

(54) METHOD OF HANDLING NFC DEVICE WITH NON-FIXED LOW POWER POLLING NUMBER AND NFC DEVICE USING THE SAME

(71) Applicant: MEDIATEK INC., Hsin-Chu (TW)

(72) Inventor: Alan Huang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/230,490

(22) Filed: Aug. 8, 2016

(65) Prior Publication Data

US 2017/0085457 A1 Mar. 23, 2017

Related U.S. Application Data

(60) Provisional application No. 62/222,727, filed on Sep. 23, 2015.

(51) Int. Cl.
| | |
|---|---|
| *H04L 12/26* | (2006.01) |
| *H04B 5/00* | (2006.01) |
| *H04W 52/02* | (2009.01) |
| *H04L 12/12* | (2006.01) |
| *H04L 12/24* | (2006.01) |

(52) U.S. Cl.
CPC ......... *H04L 43/103* (2013.01); *H04B 5/0075* (2013.01); *H04L 12/12* (2013.01); *H04L 41/12* (2013.01); *H04W 52/0216* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 8,693,949 B2 | 4/2014 | Royston | |
| 8,929,812 B2 | 1/2015 | Gree | |
| 2004/0116074 A1* | 6/2004 | Fujii | G06K 7/0008 455/41.2 |
| 2012/0045989 A1* | 2/2012 | Suumaki | H04W 8/005 455/41.1 |
| 2012/0077434 A1* | 3/2012 | Royston | H04W 76/02 455/41.1 |
| 2012/0214411 A1* | 8/2012 | Levy | H04B 5/0075 455/41.1 |
| 2013/0079026 A1* | 3/2013 | Hagedorn | H04W 4/008 455/456.1 |
| 2013/0281013 A1* | 10/2013 | Hillan | H04B 5/02 455/41.1 |
| 2014/0073240 A1* | 3/2014 | Gree | H04W 52/0216 455/41.1 |
| 2015/0017909 A1* | 1/2015 | Meunier | H04N 5/23229 455/41.1 |

* cited by examiner

*Primary Examiner* — Alejandro Rivero
(74) *Attorney, Agent, or Firm* — Winston Hsu

(57) ABSTRACT

A method of handling a near field communications (NFC) device includes setting a low power polling number, wherein the low power polling number is non-fixed; detecting whether any NFC device is nearby; performing low power polls until either at least one NFC device is detected or the number of low power polls reaches the low power polling number; performing a full power polling; and adjusting the low power polling number after the full power polling.

10 Claims, 3 Drawing Sheets

METHOD OF HANDLING NFC DEVICE WITH NON-FIXED LOW POWER POLLING NUMBER AND NFC DEVICE USING THE SAME

CROSS REFERENCE TO RELATED APPLICATIONS

This application claims the benefit of U.S. Provisional Application No. 62/222,727, filed on Sep. 23, 2015, the contents of which are incorporated herein by reference.

BACKGROUND

The present invention relates to a method of handling a near field communications (NFC) device, and more particularly, to a method of handling an NFC device with a non-fixed low power polling number and the NFC device using the same.

NFC is a modern wireless communication technology implemented based on electromagnetic induction. By bringing two electronic devices within a small distance from each other, the electronic devices are able to establish communication with each other and perform data transmission. For example, a portable device having NFC functions is able to read electronic tags or make payments when connected to an NFC-compliant apparatus. There are three signaling technologies for NFC devices to communicate with each other, i.e., NFC-A, NFC-B and NFC-F, which are realized by different coding and/or modulation schemes.

An NFC polling operation is performed to find out an NFC counterpart in the vicinity. The NFC protocols specify a flow of NFC polling, which polls NFC-A, NFC-B and NFC-F in turn in one cycle. The polling operation for these three types of NFC devices consumes much power. Thus, the industry is working on developing other polling operations to save power consumption.

SUMMARY

It is therefore an objective of the present invention to provide a near field communications (NFC) device and a method of low power polling operated in the NFC device, where a non-fixed low power polling number is set.

The present invention discloses a method of handling an NFC device. The method comprises setting a low power polling number, wherein the low power polling number is non-fixed; detecting whether any NFC device is nearby; performing low power polls until either at least one NFC device is detected or the number of low power polls reaches the low power polling number; performing a full power polling; and adjusting the low power polling number after the full power polling.

The present invention further discloses an NFC device, which comprises an NFC interface, a polling number generator and an NFC controller. The polling number generator is used for generating a low power polling number, wherein the low power polling number is non-fixed. The NFC controller, coupled to the NFC interface and the polling number generator, is used for performing the following steps: detecting whether any NFC device is nearby; performing low power polls until either at least one NFC device is detected or the number of low power polls reaches the low power polling number; and performing a full power polling. The polling number generator adjusts the low power polling number after the full power polling.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
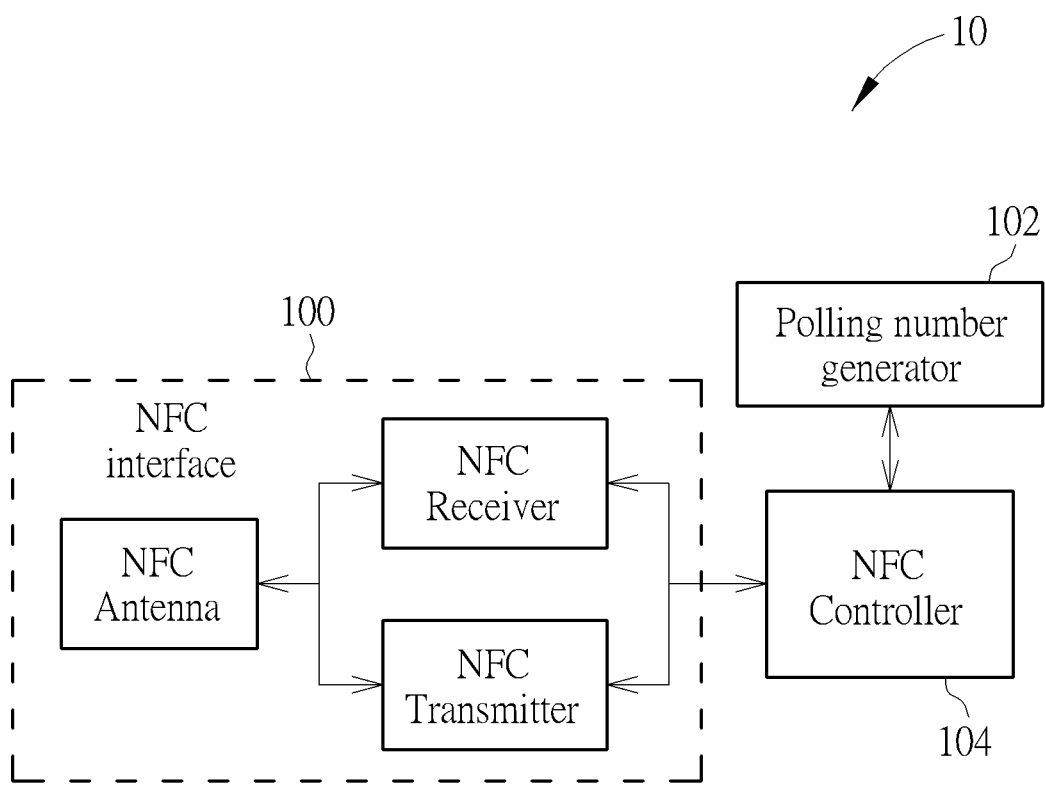
FIG. 1 is a schematic diagram of an NFC device according to an embodiment of the present invention.

Please refer to FIG. 1, which is a schematic diagram of a near field communications (NFC) device 10 according to an embodiment of the present invention. The NFC device 10 includes an NFC interface 100, a polling number generator 102 and an NFC controller 104. The NFC interface 100, which acts as an interface for communicating with other NFC devices, may include an NFC antenna and an NFC transmitter and/or an NFC receiver. If the NFC device 10 supports the active mode as an NFC host, the NFC transmitter is included and is applied to poll and detect an NFC tag in the vicinity. If the NFC device 10 supports the passive mode as a smartcard, the NFC receiver is included and is applied to receive signals and power from another NFC device operated in the active mode.

The NFC device 10 is capable of performing full power polling and low power polling operations when acting as an NFC host. The full power polling refers to an entire polling flow to poll the types NFC-A, NFC-B and NFC-F as specified in the NFC protocols, and the full power polling flow requires considerable power consumption. In order to reduce the power consumption, the low power polling is applied. The low power polling refers to a detection technology that is capable of determining whether there is any possible NFC device in the vicinity by transmitting a small signal and then detecting a signal. As its name implies, the low power polling consumes much less power than the full power polling. In an embodiment, the full power polling and low power polling are performed alternately. For example, the NFC device 10 may perform the full power polling when the low power polling operation determines that there may be an NFC device nearby, e.g., when the NFC device 10 receives an NFC tag. Alternatively, the NFC device 10 may perform the low power polling several times and then perform the full power polling one time even if there is no other NFC devices nearby detected by the low power polling, in order to enhance the reliability of the polling operation.

The polling number generator 102 is configured to set a low power polling number R, where the low power polling number R is non-fixed. With the low power polling number R, the NFC device 10 may perform low power polls R times and then perform full power polling unless a possible NFC device nearby is detected. In other words, the NFC device 10 may perform low power polls until either at least one NFC device is detected or the number of low power polls reaches the low power polling number R. After the full power polling, the polling number generator 102 may adjust the low power polling number R or generate a different low power polling number. In other words, the low power polling number R may be variable or non-fixed. The low power polling number R may be generated randomly or based on the usage of NFC device 10 and environmental factors, allowing the NFC device 10 to flexibly perform the low power polling and full power polling. The NFC controller 104 is used for controlling the operations related to NFC transmissions, e.g., transmission and reception of NFC tags, and polling operations.

Figure 2:
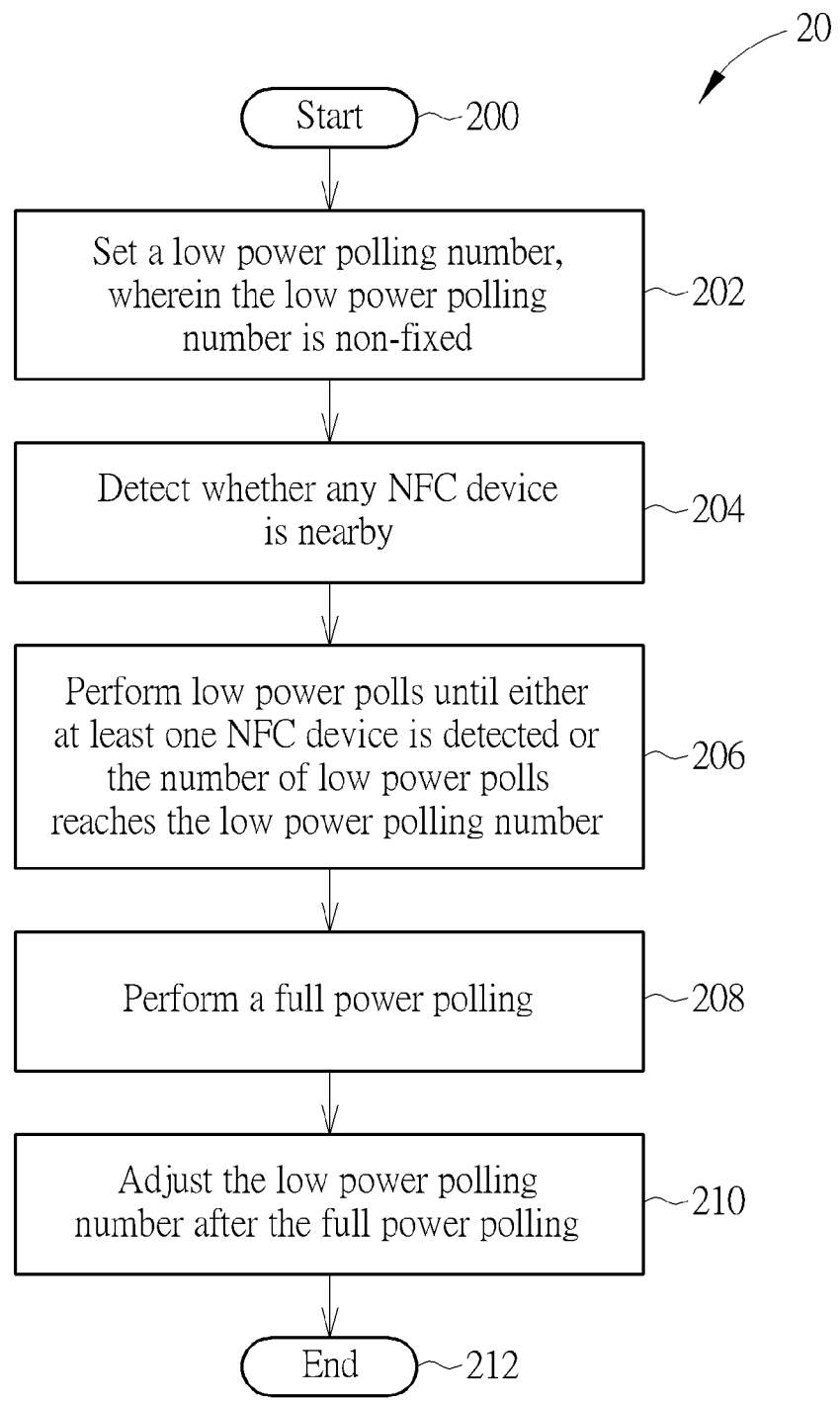
FIG. 2 is a flow chart of a polling operation of the NFC device according to an embodiment of the present invention.

Please refer to FIG. 2, which is a flow chart 20 of a polling operation of the NFC device according to an embodiment of the present invention. The flow chart 20, which may be applied to any NFC device operated in the active mode such as the NFC device 10 shown in FIG. 1, includes the following steps:

Step 200: Start.
Step 202: Set a low power polling number, wherein the low power polling number is non-fixed.
Step 204: Detect whether any NFC device is nearby.
Step 206: Perform low power polls until either at least one NFC device is detected or the number of low power polls reaches the low power polling number.
Step 208: Perform a full power polling.
Step 210: Adjust the low power polling number after the full power polling.
Step 212: End.

According to the flow chart 20, the polling number generator 102 may set the low power polling number R, where the low power polling number R is non-fixed or variable. After the low power polling number R is set, the NFC controller 104 may start to perform low power polls based on the low power polling number R. The NFC controller 104 may also detect whether any NFC device is nearby by determining whether a signal corresponding to the low power polling is detected. The signal, which may be generated from the inductive effect of an NFC device, indicates that an object that may be an NFC device is in the vicinity. Therefore, if the NFC controller 104 determines that the signal is detected, the NFC controller 104 may perform the full power polling to determine whether the detected object is an NFC device, e.g., to determine whether the signal is a valid NFC tag. If there is no signal detected, the NFC controller 104 may continue to perform low power polls until R times of low power polls are accomplished. The NFC controller 104 then performs full power polling after the number of low power polls reaches the low power polling number R, in order to determine whether there is any NFC device failing to be detected by the low power polling operation. In other words, the full power polling is performed when the low power polling is performed R times or when the signal corresponding to the low power polling is detected. After the full power polling, the NFC controller 104 may adjust the low power polling number R, i.e., generate or set a new low power polling number, and go through the polling operation of the flow chart 20 again.

Figure 3:
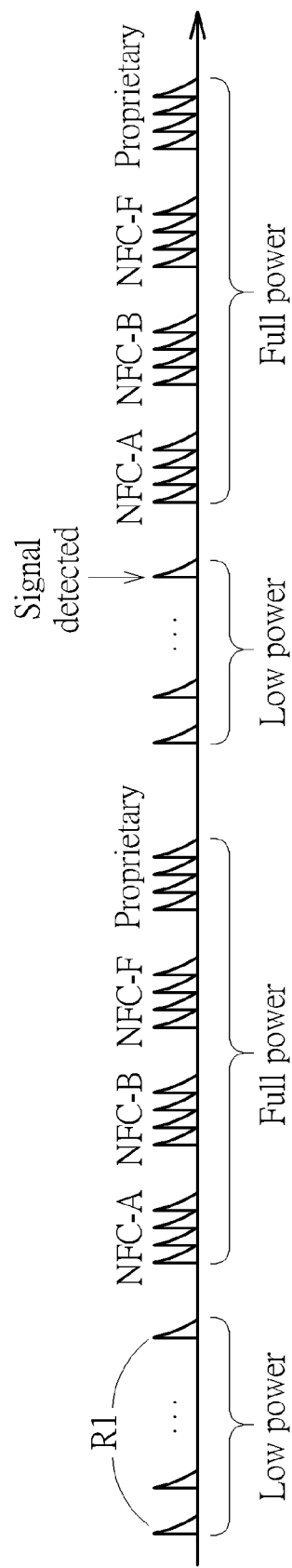
FIG. 3 is a schematic diagram of an exemplary polling operation according to an embodiment of the present invention.

Please refer to FIG. 3, which is a schematic diagram of an exemplary polling operation according to an embodiment of the present invention. The NFC device may perform low power polls R1 times, where each low power poll is illustrated as a pulse. Subsequently, the NFC device performs the full power polling after R1 low power polls since the NFC device does not detect any NFC device nearby by detecting a signal corresponding to the low power polling. The full power polling includes polling of NFC-A, NFC-B and NFC-F and proprietary polling, as specified in the NFC protocols. After the full power polling, the NFC device may change the low power polling number to R2 and perform low power polls. Before the R2 low power polls are finished, a signal is detected. Therefore, the NFC device stops the low power polling and performs the full power polling after the signal is detected. The NFC device then proceeds with the polling operations with variable low power polling number.

In an embodiment, the polling number generator 102 may be a random number generator, for randomly generating the low power polling number R. It is preferable to perform the low power polling a random number of times rather than a fixed number of times before one full power polling operation. Since the detection behavior of a user is random, the random low power polling number may detect the NFC tag more easily in an optimal case.

In an embodiment, the NFC controller 104 may obtain a maximum polling number to determine the maximum value of the low power polling number R. The maximum polling number may be set by a user or predetermined in the NFC device 10. If the polling number generator 102 is a random number generator that generates a random low power polling number R, the random low power polling number R may randomly vary under the limit of the maximum polling number. Please note that the NFC device 10 may communicate with other NFC devices via an NFC application. If the NFC application is activated, it is desirable to successfully detect the NFC tags of the NFC devices in the vicinity. In such a situation, the maximum polling number may be set to a small value to increase the usage frequency of full power polling. For example, when the NFC device 10 needs to synchronize data with another NFC device via NFC transmissions, the maximum polling number may be configured to 0 when a data transfer application using NFC is activated. In such a situation, the NFC device 10 always performs the full power polling to communicate with the NFC counterpart during the activation period of the data transfer application.

In addition to randomly generating the low power polling number R, the polling number generator 102 may also set the low power polling number R or adjust the low power polling number R according to the usage of the NFC device 10 and/or environmental factors. In an embodiment, the polling number generator 102 may increase the low power polling number R when the full power polling detects no target NFC device in the vicinity. For example, the low power polling number R is set to 2 and the NFC controller 104 performs 2 low power polls followed by the full power polling. If no NFC tag is received via the full power polling, the polling number generator 102 may increase the low power polling number R to 3 and the NFC controller 104 proceeds with the polling operations, i.e., perform 3 low power polls followed by the full power polling. In another embodiment, the low power polling number R is also set to 2. When a signal corresponding to the low power polling is detected, the NFC controller 104 may perform the full power polling. If no NFC tag is received via the full power polling, the NFC controller 104 may know that the signal is misinformation, and thereby the low power polling number R is increased to 3 and the NFC controller 104 proceeds with the polling operations.

In an embodiment, the polling number generator 102 may set the low power polling number R to the maximum polling number when the NFC device 10 is nearly out of battery. If the NFC device 10 is nearly out of battery, it is preferable to use more low power polling operations and fewer full power polling operations. Therefore, the low power polling number R may be set to its maximum possible value to increase the usage frequency of low power polling and decrease the usage frequency of full power polling, in order to save power.

In an embodiment, the polling number generator 102 may decrease the low power polling number R when the full power polling detects a specific type of target NFC device nearby. For example, if the NFC device 10 aims at sensing smartcards and one or several smartcards are detected and determined via the full power polling operation within a period of time, the NFC controller 104 may determine that the frequency of detecting the smartcards increases. In such a situation, the polling number generator 102 may decrease the low power polling number R and increase the usage frequency of the full power polling, so that the smartcards in the vicinity may be detected by the polling operations more easily. Similarly, if the full power polling fails to detect any target NFC device in a specific type, e.g., smartcard, within a period of time, the polling number generator 102 may increase the low power polling number R in order to save power.

Please note that one of the spirits of the present invention is to provide a polling operation with combination of low power polling and full power polling and a non-fixed low power polling number. Those skilled in the art can make modifications and alternations accordingly. For example, the low power polling number may be adjusted by any method. For example, the low power polling number may randomly vary, or may be adjusted according to the usage of NFC device and environmental factors; the variation way is not limited herein. In addition, the polling operation of the present invention is applicable to any NFC device that is used to poll an NFC counterpart or find an NFC tag in the vicinity.

To sum up, the polling operation of the present invention combines the low power polling and full power polling, and thereby gains the benefits of the low power polling and full power polling. One full power polling operation is performed when a possible NFC device nearby is detected or when the number of low power polls reaches a low power polling number. The low power polling number is non-fixed and flexible. In order to save power, the low power polling number may be increased to increase the usage frequency of low power polling. In order to enhance the detection reliability of NFC tags, the low power polling number may be decreased to increase the usage frequency of full power polling. The low power polling number is adjusted flexibly to be applicable to any case.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a first near field communications (NFC) device, comprising:
setting a low power polling number, wherein the low power polling number is non-fixed;
detecting whether any second NFC device is within a communicable range of the first NFC device;
performing consecutive low power polls until either at least one second NFC device is detected or the number of consecutive low power polls reaches the low power polling number, and then performing a full power polling;
adjusting the low power polling number after the full power polling;
obtaining a maximum polling number to determine a maximum value of the low power polling number; and
decreasing the maximum polling number when an NFC application is activated.

2. The method of claim 1, wherein the step of setting the low power polling number comprises:
randomly setting the low power polling number.

3. The method of claim 1, wherein the step of adjusting the low power polling number comprises:
increasing the low power polling number when the full power polling detects no other second NFC device within the communicable range of the first NFC device.

4. The method of claim 1, wherein the step of adjusting the low power polling number comprises:
decreasing the low power polling number when the full power polling detects a specific type of target second NFC device within the communicable range of the first NFC device.

5. The method of claim 1, further comprising:
increasing a usage frequency of the full power polling when an NFC application is activated.

6. A first near field communications (NFC) device, comprising:
an NFC interface;
a polling number generator, for generating a low power polling number, wherein the low power polling number is non-fixed; and
an NFC controller, coupled to the NFC interface and the polling number generator, for performing the following steps:
detecting whether any second NFC device is within a communicable range of the first NFC device;
performing consecutive low power polls until either at least one second NFC device is detected or the number of consecutive low power polls reaches the low power polling number, and then performing a full power polling;
obtaining a maximum polling number to determine a maximum value of the low power polling number; and
decreasing the maximum polling number when an NFC application is activated;
wherein the polling number generator adjusts the low power polling number after the full power polling.

7. The first NFC device of claim 6, wherein the polling number generator is a random number generator, for randomly setting the low power polling number.

8. The first NFC device of claim 6, wherein the polling number generator increases the low power polling number when the full power polling detects no other second NFC device within the communicable range of the first NFC device.

9. The first NFC device of claim 6, wherein the polling number generator decreases the low power polling number when the full power polling detects a specific type of target second NFC device within the communicable range of the first NFC device.

10. The first NFC device of claim 6, wherein the NFC controller further performs the following step:
increasing a usage frequency of the full power polling when an NFC application is activated.

* * * * *